July 1, 1952  W. J. HOLT, JR  2,601,797
WIRE STRIPPER
Filed Jan. 12, 1950  2 SHEETS—SHEET 1
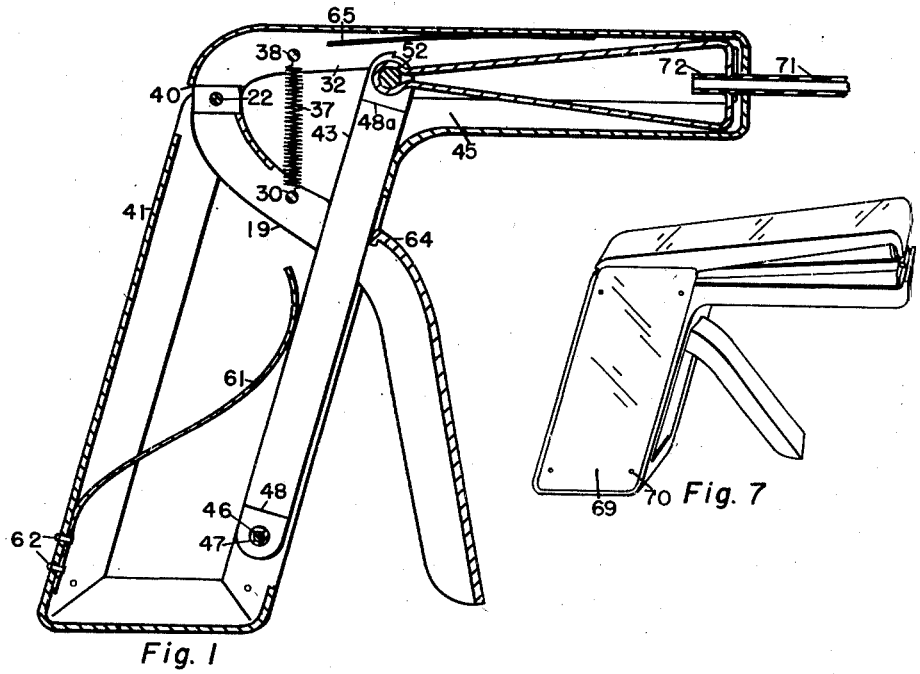
Fig. 1
Fig. 7
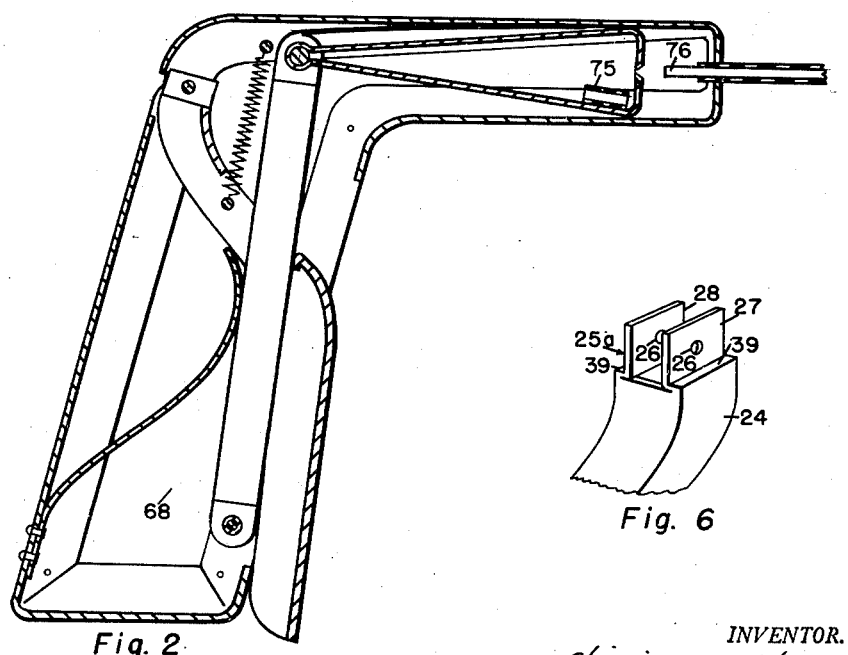
Fig. 2
Fig. 6
INVENTOR.
William J. Holt, Jr July 1, 1952  W. J. HOLT, JR  2,601,797
WIRE STRIPPER
Filed Jan. 12, 1950  2 SHEETS—SHEET 2
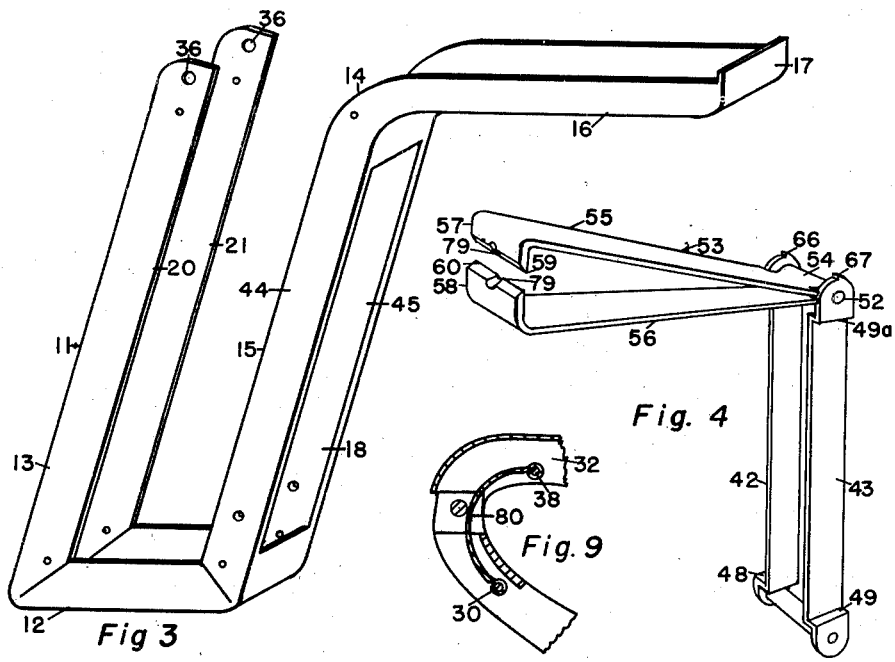
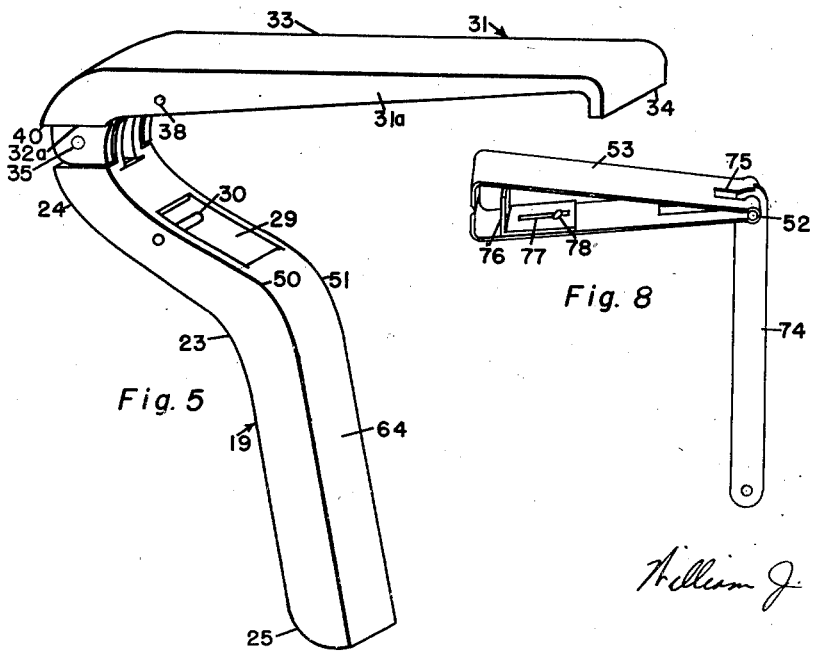
INVENTOR.
William J. Holt, Jr.

Patented July 1, 1952

2,601,797

UNITED STATES PATENT OFFICE 2,601,797

WIRE STRIPPER

William J. Holt, Jr., Garland, Tex.

Application January 12, 1950, Serial No. 138,189

11 Claims. (Cl. 81—9.5)

This invention relates to wire stripping devices and, more particularly to manually operated devices for stripping insulation from wire.

In the construction of electrical and electronic equipment and in the servicing of such equipment, it has heretofore been the practice to cut a connecting wire to the estimated correct length and then strip the insulation from the ends of the wire before connecting its ends at the desired points in the equipment. Since it is often impossible to estimate correctly the proper length of the wire until it has been placed in position, it often becomes necessary to cut the wire again and to strip once more the insulation from one end of the wire. The presently available wire strippers, however, are bulky and cannot be employed in the small spaces open in the electrical or electronic devices. It becomes necessary to strip the insulation with a small knife or to detach the wire from the device, strip the insulation, and again attach the wire in the device. A wire stripping device adapted to operate within the electrical or electronic device greatly decreases the time and labor involved in connecting elements of the device with insulated wire.

Accordingly, it is an object of my invention to provide a new and improved wire stripping device.

It is another object of my invention to provide a new and improved wire stripping device adapted to operate within small spaces.

It is another object of my invention to provide a new and improved wire stripping device having wire holding jaws and insulation stripping jaws adapted to be inserted in, and operate in, small spaces.

It is still another object of my invention to provide a new and improved hand operated wire stripping device having wire gripping jaws and insulation stripping jaws adapted to be inserted in, and to operate in, small spaces.

Briefly stated, my new and improved wire stripping device comprises a frame member having a substantially rectangular handle portion and a jaw portion extending at an angle from the handle portion. A movable jaw is pivotally secured to the handle portion and cooperates with the jaw portion to grip the wire whose insulation is to be stripped. A pair of insulation stripping jaws are mounted between the wire gripping jaw and jaw portion and are adapted to cut through the insulation of the wire when the movable jaw is moved by an operating lever into gripping relation with the jaw portion. The operating lever is also pivoted on the handle portion and coacts with a pair of levers pivoted on the lower end of the handle portion to retract the wire stripping jaws within the gripping jaws and pull off the insulation from the end of the wire after the stripping jaws have cut through the insulation. The stripping jaws are maintained in their retracted position by a spring catch which contacts the pair of levers in order to allow the gripping jaws to open and the wire to be freed of the device before the stripping jaws are returned to their normal position. The spring catch is mounted on the movable jaw of the device and releases the stripping jaws when the movable jaw has returned to almost its fully open position.

For a better understanding of my invention reference may be had to the following drawing in which:

Figure 1 is a longitudinal sectional view of the wire stripping device showing the position of the various elements at one instant of the cycle of operation;

Figure 2 is a longitudinal sectional view of the device illustrated in Figure 1 showing the position of the various elements at another instant of the cycle of operation;

Figure 3 is a perspective view of one element of the device;

Figure 4 is a perspective view of a part of the device with jaws in open position;

Figure 5 is a perspective view of two elements of the device;

Figure 6 is a fragmentary perspective view of one of the elements shown in Figure 5;

Figure 7 is a reduced perspective view of the device shown in Figures 1 to 6; and Figure 8 is a perspective view of a modified embodiment of the parts shown in Figure 4;

Figure 9 is a fragmentary sectional view of a modified embodiment of one of the elements of my device.

Referring now to the drawing, my wire stripping device comprises a frame member 11 having an intermediate channel portion 12, a rear channel portion 13 extending at an angle to and secured to one end of intermediate channel portion 12, and a front channel portion 14. Channel portion 14 comprises a portion 15 parallel to rear channel portion 13 and an upper extension 16 projecting outwardly from portion 15 and substantially parallel to intermediate portion 12. Extension 16 is provided at its outer end with an upwardly projecting extension which forms a jaw 17.

Portion 15 of frame member 11 is provided with a rectangular aperture 18 through which passes an operating lever 19. The upper end of operating lever 19 is pivotally secured to the upper portion of rear channel member 13 intermediate the side portions 20 and 21 by means of a shaft 22. Operating lever 19 is substantially S-shaped having a curved intermediate section 23, an upper end 24 and a lower rounded end 25, the two ends 24 and 25 extending oppositely and substantially perpendicularly from intermediate section 23. The upper end 24 of operating lever 19 is provided with a reduced portion 25a having apertures 26 in its sides 27 and 28 while the intermediate section 23 is provided with a substantially rectangular aperture 29 and a transversely disposed pin 30.

Pivotally secured to the reduced portion 25a of operating lever 19 is a jaw member 31 which is substantially channel shaped having laterally separated parallel sides 31a and 32 joined by a web 33. The forward end of jaw member 31 has a downwardly extending portion forming a jaw 34 which coacts with jaw 17 of frame member 11 to grip the wire to be stripped. The rear end of jaw member 31 extends downwardly and the sides 31a and 32 fit over the reduced portion 25a, the portions of sides 31a and 32 fitting over reduced portion 25a are also reduced as at 32a. The sides 31a and 32 are provided with apertures 35 which coincide with apertures 26 of sides 27 and 28 of reduced portion 25a and with apertures 36 of sides 20 and 21 of rear portion 13. Operating lever 19 and jaw member 31 are designed to fit between the sides 20 and 21 of frame member 11 and are pivotally secured to frame member 11 by shaft 22 which extends through apertures 26, 35 and 36 and is secured to frame member 11 by peening or any other suitable means.

Jaw member 31 and operating lever 19 are also connected by an elastic member 37, such as a metal spring, which has one end connected to pin 30 of operating lever 19 and the other end connected to a pin 38 secured to sides 31a and 32 of jaw member 31. Elastic member 37 is prevented from bringing the intermediate section 23 of operating lever 19 into abutting relation with jaw member 31 by the shoulders 39 between upper end 24 and reduced portion 25a which engage the ends of sides 31a and 32. A portion of web 33 adjacent shaft 22 is cut away forming a shoulder 40 in order to prevent blocking of the upward pivoted movement of jaw 34 by web 41 of rear channel portion 13.

A pair of levers 42 and 43 are pivotally connected at their lower ends to the sides 44 and 45 of portion 15 by means of a shaft 46 secured to the lower portions of sides 44 and 45 by peening or any other suitable method. In order to keep the lower ends of levers 42 and 43 properly spaced a cylindrical spacing member 47 is positioned on shaft 46 between levers 42 and 43. Levers 42 and 43 are offset inwardly at 48, and 48a, and 49 and 49a, respectively, in order to clear sides 50 and 51 of intermediate section 23 of operating lever 19 since levers 42 and 43 pass through aperture 29.

Secured to the upper ends of levers 42 and 43 by means of a pin 52 is a spring 53 having a bight portion 54 partially encircling pin 52 and forwardly extending portions 55 and 56 which terminate in stripping jaws 57 and 58, respectively. Jaws 57 and 58 extend substantially perpendicularly from portions 55 and 56 and toward each other. Stripping jaws 57 and 58 are provided with grooved cutting edges 59 and 60 which are adapted to cut through the insulation of a wire. In order to maintain stripping jaws 57 and 58 in forward positions adjacent gripping jaws 17 and 34, a biasing member, such as a leaf spring 61 is provided. Leaf spring 61 has one end secured to rear channel portion 13 by means of rivets or any other suitable means while its other end presses against lever 43 to maintain levers 42 and 43 adjacent portion 15.

Levers 42 and 43 pass through aperture 29 in operating lever 19 and are contacted by the web 64 contiguous aperture 29 of operating lever 19 as lever 19 is pivoted about shaft 22 to bring its lower end 25 into proximity with portion 15. After levers 42 and 43 are contacted by web 64 further movement of operating lever 19 will cause levers 42 and 43 to pivot about shaft 46. In this movement the upper ends of levers 42 and 43 are brought into contact with a spring catch 65. Spring catch 65 has one end secured to a movable jaw 31 in any suitable manner as by welding or riveting and has its free end contacting spurs 66 and 67 on levers 42 and 43, respectively. Further movement of levers 42 and 43 after spurs 66 and 67 have contacted spring catch 65 will cause spurs 66 and 67 to engage the free end of spring catch 65. Spring catch 65 will then hold levers 42 and 43 in their pivoted or actuated positions, as shown in Figure 2, until the operating lever is released and movable jaw 31 opens. When movable jaw 31 opens, jaws 57 and 58 also open and only then does spring catch 65 allow stripping jaws 57 and 58 to move forward. Side plates 68 and 69 are secured to frame member 11 by means of screws 70 or other suitable securing means.

The forward extension 16 and jaw member 31 are made small enough to enter the confined spaces in electrical and electronic equipment, e.g., radio chassis. All of the parts of my wire stripping device with the exception of flexible member 37, leaf spring 61 and spring catch 65, may be made of sheet steel. This construction will ensure maximum strength and lightness of weight. If desired, side plates 68 and 69 which act as bracing and stiffening members for frame member 11 may be made of plastic material.

In operation, forward extension 16 and jaw member 31 are inserted into the small space in which the wire 71 to be stripped is located and are so disposed that the end of the wire lies between gripping jaws 17 and 34 and stripping jaws 57 and 58. Pressure is then exerted on operating lever 19 by the fingers of the hand which holds the wire stripping device. As operating lever 19 is pivoted about shaft 22, it causes jaw member 31 to pivot also about shaft 22 since jaw member 31 is connected to operating lever 19 by elastic member 37. In its movement, jaw member 31 contacts portion 55 of spring 53 and causes portions 55 and 56 to approach each other since portion 56 is constrained by forward extension 16 of frame member 11 and since the force necessary to bend spring 53 is less than the force necessary to stretch elastic member 37. Continued movement of operating lever 19 causes gripping jaws 17 and 34 to contact and grip the wire and stripping jaws 57 and 58 to contact the wire and cut through its insulation 72. Further movement of operating lever 19 will not cause jaws 17 and 34 and stripping jaws 57 and 58 to approach each other since the force necessary to effect such movement will be greater than the force necessary to stretch elastic member 37. During such further movement of operating lever 19, however, web 64 contacts levers 42 and 43 and causes them to pivot about shaft 46 and retract spring 53. Since the wire is continually gripped by jaws 17 and 34, retraction of spring 53 will cause jaws 57 and 58 to strip the insulation 75 off the end of wire 74. After levers 42 and 43, and therefore spring 53, have moved a predetermined distance, spurs 66 and 67 of levers 42 and 43 contact spring catch 65, push spring catch 65 upwardly and move past the free end of spring catch 65. If operating lever 19 is now released, levers 42 and 43 will not be able to move back to their original position since they are maintained in their activated position by spring catch 65. Spring 53, however, exerts sufficient force to open jaws 57 and 58 and to move jaw member 31 to its original open position and wire 71 is no longer gripped by jaws 17 and 34. In moving upwardly, jaw member 31 moves the free end of spring catch 65 from engagement with spurs 66 and 67 and levers 42 and 43 move to their original positions due to the force exerted by spring 61. Spring catch 65 is employed to prevent jaws 57 and 58 from contacting and bending the stripped end 76 of wire 71 when operating lever 19 is released.

It will be apparent that the wire stripping device may be modified without departing from the scope of my invention. For example, the levers 42 and 43 may be replaced by a single lever 74 as is shown in Figure 8 in which case spring 53 must be provided with a slot 75 to receive the lever 74. If it is desired, spring 53 may be provided with a stop 76 which will limit the length of the wire which can be inserted between jaws 57 and 58 thereby ensuring that only a certain predetermined length of wire 71 will be stripped of insulation 72. Stop 76 may be secured to jaw 56 by means of a slot 77 and bolt 78 means to permit adjustment of the length of insulation 72 to be stripped.

Elastic member 37 which is a spring of the coil type may be replaced by a length of elastic material such as rubber or by a leaf spring 80.

Pin 52 is journaled in the upper ends of levers 42 and 43 and is maintained in operative position by side plates 68 and 69. This construction facilitates replacement of spring 53 since it is merely necessary to remove one of the side plates 68 or 69 and slip out pin 52 from levers 42 and 43 to free spring 53 from all retaining means. It is sometimes desirable to substitute spring 53 with similar springs which are provided with grooved cutting edges 57 and 58 having grooves 79 of different sizes in order to permit the stripping of insulation from different sized wires.

It will be apparent to those skilled in the art that various changes and modifications may be made in the above described and illustrated embodiment of my invention without departing from the spirit and scope of my invention and I, therefore, aim in the appended claims to cover all such changes and modifications as fall within the true spirit and scope of my invention.

What I claim as new and desire to secure by Letters Patent of the United States is:

1. A wire stripping device comprising a frame member; a longitudinal member extending substantially perpendicularly from said frame member, said longitudinal member terminating in a gripping jaw; a movable member pivotally mounted on said frame member, said movable member having a gripping jaw adapted to cooperate with said first mentioned jaw; an operating lever pivotally mounted on said frame member; an elastic member connecting said movable member and said operating lever for moving said first mentioned gripping jaw adjacent said second mentioned gripping jaw; a pair of wire stripping jaws mounted between said longitudinal member and said movable member, said wire stripping jaws abutting said longitudinal member and said movable member and being adapted to be moved adjacent one another by said movable member; and a lever pivotally secured to said frame member and to said wire stripping jaws, said lever contacting said operating lever to retract said stripping jaws from said gripping jaws after said stripping jaws have been moved adjacent each other.

2. The wire stripping device of claim 1, and a spring secured to said frame member for urging said wire stripping jaws into position adjacent said wire gripping jaws.

3. The wire stripping device of claim 2, and a catch secured to said movable member and contacting said second mentioned lever to retain said wire stripping means in retracted position.

4. The wire stripping device of claim 1, and means secured to said movable member and contacting said second mentioned lever to retain said wire stripping means in retracted position.

5. The device comprising a handle; elongated gripping means extending at an angle from said handle; insulation cutting and stripping means positioned within said gripping means, said gripping means abutting said cutting and stripping means; an operating lever pivotally mounted on said handle and coupled to said gripping means for actuating said gripping means, said insulation cutting and stripping means being adapted to cut insulation upon actuation of said gripping means; and retracting means pivotally connected to said cutting and stripping means and said handle for retracting said cutting and stripping means toward said handle, said retracting means contacting said operating lever after actuation of said gripping means.

6. The device of claim 5, and means secured to said gripping means and contacting said operating lever to retain said insulation cutting and stripping means in retracted position.

7. The device of claim 5, and a biasing member secured to said handle for urging said insulation cutting and stripping means into a non-retracted position.

8. The device comprising a handle member; an immovable gripping jaw member rigidly fixed to said handle member and extending at an angle from said handle member; a movable gripping jaw member pivotally secured to said handle member and adapted to coact with said immovable gripping jaw member; an operating lever pivotally secured to said handle member; an elastic member connecting said movable gripping jaw member and said operating lever; insulation cutting and stripping jaws positioned between said gripping jaw members, each of said gripping jaw members abutting its adjacent cutting and stripping jaw; elastic means connected to said insulation cutting and stripping jaws for maintaining said jaws in open position, said movable gripping jaw member moving said jaws into closed position when actuated by said operating lever; a retracting lever pivotally secured to said handle member and slidably contacting said operating lever for retracting said jaws toward said handle member while in said closed position; spring catch means secured to said movable gripping jaw member and coacting with said retracting lever for maintaining said lever in said retracted position; and resilient means fixed to said handle member and abutting said retracting lever for urging said jaws into non-retracted position.

9. The device comprising a handle member; an immovable gripping jaw member rigidly fixed to said handle member and extending at an angle from said handle member; a movable gripping jaw member pivotally secured to said handle member and adapted to coact with said immovable gripping jaw member; an operating lever pivotally secured to said handle member; an elastic member connecting said movable gripping jaw member and said operating lever; insulation cutting and stripping jaws positioned between said gripping jaw members, each of said gripping jaw members abutting its adjacent cutting and stripping jaw; elastic means for maintaining said jaws in open position, said movable gripping jaw member moving said jaws into closed position when actuated by said operating lever; and a retracting lever pivotally secured to said handle member and slidably contacting said operating lever for retracting said stripping jaws toward said handle member while in said closed position.

10. The device of claim 9, and a catch cooperating with said retracting lever for maintaining said lever in said retracted position.

11. The device of claim 9, and resilient means fixed to said handle member and abutting said retracting lever for urging said jaws into non-retracted position.

WILLIAM J. HOLT, Jr.

REFERENCES CITED

The following references are of record in the file of this patent:

UNITED STATES PATENTS

| Number | Name | Date |
|---|---|---|
| 520,818 | Bettinger | June 5, 1894 |
| 1,196,322 | Wood | Aug. 29, 1916 |
| 1,618,734 | Smitak | Feb. 22, 1927 |
| 1,857,731 | Lund | May 10, 1932 |
| 2,179,581 | Voogel | Nov. 14, 1939 |
| 2,407,233 | Greer | Sept. 10, 1946 |
| 2,523,936 | Axelsen | Sept. 26, 1950 |

FOREIGN PATENTS

| Number | Country | Date |
|---|---|---|
| 780,257 | France | Jan. 29, 1935 |
| 619,302 | Germany | Sept. 27, 1935 |